United States Patent [19]

Hoffmann et al.

[11] Patent Number: 5,425,585
[45] Date of Patent: * Jun. 20, 1995

[54] TROLLEY WHEEL ASSEMBLY

[76] Inventors: Arnold R. Hoffmann, 274 Longford Dr., Rochester, Mich. 48063; Peter A. Hochstein, 2966 River Valley Dr., Troy, Mich. 48098; Frank F. Hoffmann, 1145 N. River Rd., St. Clair, Mich. 48079

[*] Notice: The portion of the term of this patent subsequent to Aug. 2, 2011 has been disclaimed.

[21] Appl. No.: 271,166

[22] Filed: Jul. 6, 1994

Related U.S. Application Data

[63] Continuation of Ser. No. 967,818, Oct. 28, 1992, Pat. No. 5,333,956.

[51] Int. Cl.6 ............................................. F16C 33/76
[52] U.S. Cl. ..................................... 384/483; 277/83; 277/96.2; 384/477
[58] Field of Search ............... 384/449, 477, 479, 481, 384/482, 483; 277/81 R, 83, 85, 93.5 D, 96.2

[56] References Cited

U.S. PATENT DOCUMENTS

| | | | |
|---|---|---|---|
| 2,144,691 | 11/1937 | Schmal | 277/95 |
| 2,916,335 | 8/1957 | Cogger . | |
| 3,428,375 | 2/1969 | Martin . | |
| 3,537,725 | 11/1969 | Frost | 384/480 |
| 4,325,591 | 4/1982 | Otto | 384/486 |
| 4,687,349 | 8/1987 | Pachuta | 384/477 |
| 4,863,293 | 9/1989 | Sytsma | 384/482 |

FOREIGN PATENT DOCUMENTS 63-130921 6/1988 Japan .

*Primary Examiner*—Thomas R. Hannon
*Attorney, Agent, or Firm*—Reising, Ethington, Barnard, Perry & Milton

[57] ABSTRACT

A trolley wheel assembly (10) securely sealed to prevent loss of lubricant therefrom and entrance of contaminants therein. The assembly (10) comprises an inner race (12) disposed about an axis of rotation (14) and an outer race (16) concentrically disposed in a spaced relationship about the inner race (12). A plurality of ball bearings (18) are disposed between the inner race (12) and the outer race (16). An outer sealing ring (20) extends radially inwardly from the outer race (16) toward the inner race (12). An inner sealing ring (22) is rotatably disposed about the inner race (12), extending radially outwardly and contiguous the outer sealing ring (20). A wave washer (24) disposed about the inner race (12) biases the inner sealing ring (22) into constant friction engagement with the outer sealing ring (20). A plurality of backup inner sealing rings (26,27) provide a secondary seal about the inner race (12).

15 Claims, 2 Drawing Sheets

TROLLEY WHEEL ASSEMBLY

This is a continuation of application Ser. No. 07/967,818 filed on Oct. 28, 1992 now U.S. Pat. No. 5,333,956.

TECHNICAL FIELD

The subject invention generally relates to a trolley wheel assembly. More particularly, the subject invention relates to a seal in the trolley wheel assembly for preventing loss of lubricant therefrom and entrance of contaminants therein.

BACKGROUND OF THE INVENTION

Trolley systems are a common way to transport workpieces, tools, etc. from one location to another in a manufacturing environment. Typically, the system includes a load carrying platform mounted on trolley wheels. A track is laid out to guide the trolley wheels along a desired path.

The trolley wheels generally include an outer race, an inner race, and ball bearings disposed therebetween to permit rotation of the outer race about the inner race. The ball bearings require a large amount of lubricant in order to operate properly. In addition, the bearings must be protected from outside contaminants such as dirt which can cause premature failure of the assembly. Accordingly, sealing assemblies are provided to seal the lubricant within the trolley wheel and protect the wheel from contaminants.

There are inherent problems associated with trolley wheel sealing assemblies. Due to the relative movement between the inner and outer races, a rigid sealing connection cannot be made between the races. Rather, sealing members extending from the inner and outer races are joined in slidable friction engagement to create a seal therebetween. However, the friction engagement between the seals produces wear after substantial use which reduces the integrity of the seal as time passes.

One way to reduce the wear between the sealing members is to make the sealing member extending from the inner race rotatable thereabout. That is, by mounting the inner race sealing member in a rotatable fashion about the inner race, a portion of the rotational momentum of the outer race sealing member will be imparted to the inner race sealing member. There will be less relative motion between the sealing members because of the rotation of the inner race sealing member, thus producing less slidable resistance between the sealing members. Accordingly, there will be less wear produced by the slidable friction engagement between the sealing members. However, this will produce wear on an inner circumferential edge of the inner race sealing member as it rotates about the inner race. This is troublesome as a small increase in the inner diameter of the inner race sealing member can affect the integrity of the seal.

SUMMARY OF THE INVENTION AND ADVANTAGES

The present invention involves a trolley wheel assembly securely sealed to prevent loss of lubricant from within the assembly and entrance of contaminants into the assembly over extended operating periods. The assembly includes an inner race disposed about an axis of rotation. An outer race is concentrically disposed in a spaced relationship about the inner race. A plurality of ball bearings are disposed radially between the inner race and the outer race to permit the outer race to rotate about the inner race. An outer sealing ring is fixedly mounted to the outer race and extends radially inwardly toward the inner race. An inner sealing ring is rotatably disposed about the inner race, extending radially outwardly toward the outer race and contiguous the outer sealing ring. A biasing means is disposed about the inner race for biasing the inner sealing ring into constant friction engagement with the outer sealing ring. The invention is characterized by at least one backup inner sealing ring rotatably disposed about the inner race between the biasing means and the inner sealing ring to provide a secondary seal around the inner race as rotation of the inner sealing ring against the inner race produces wear on the inner sealing ring and a less secure fit about the inner race.

The present invention is advantageous in that rotation of the inner sealing ring about the inner race is permitted without sacrificing the integrity of the seal between the inner and outer races. The rotation of the inner sealing ring will still produce wear thereon and lessen the effectiveness of the seal between the inner race and the inner sealing ring. However, a backup inner sealing ring provides a secondary seal about the inner race in the event of failure of the seal between the inner sealing ring and the inner race.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
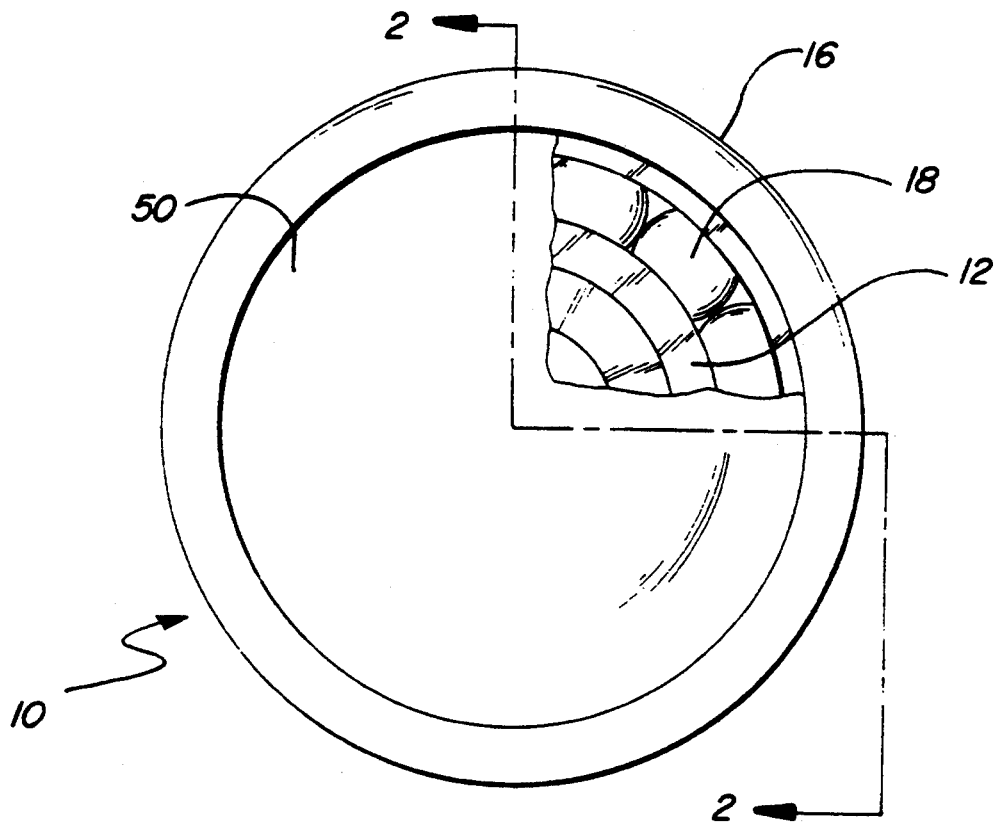
FIG. 1 is a frontal view, partially cut-away, of the trolley wheel of the present invention.
Figure 2:
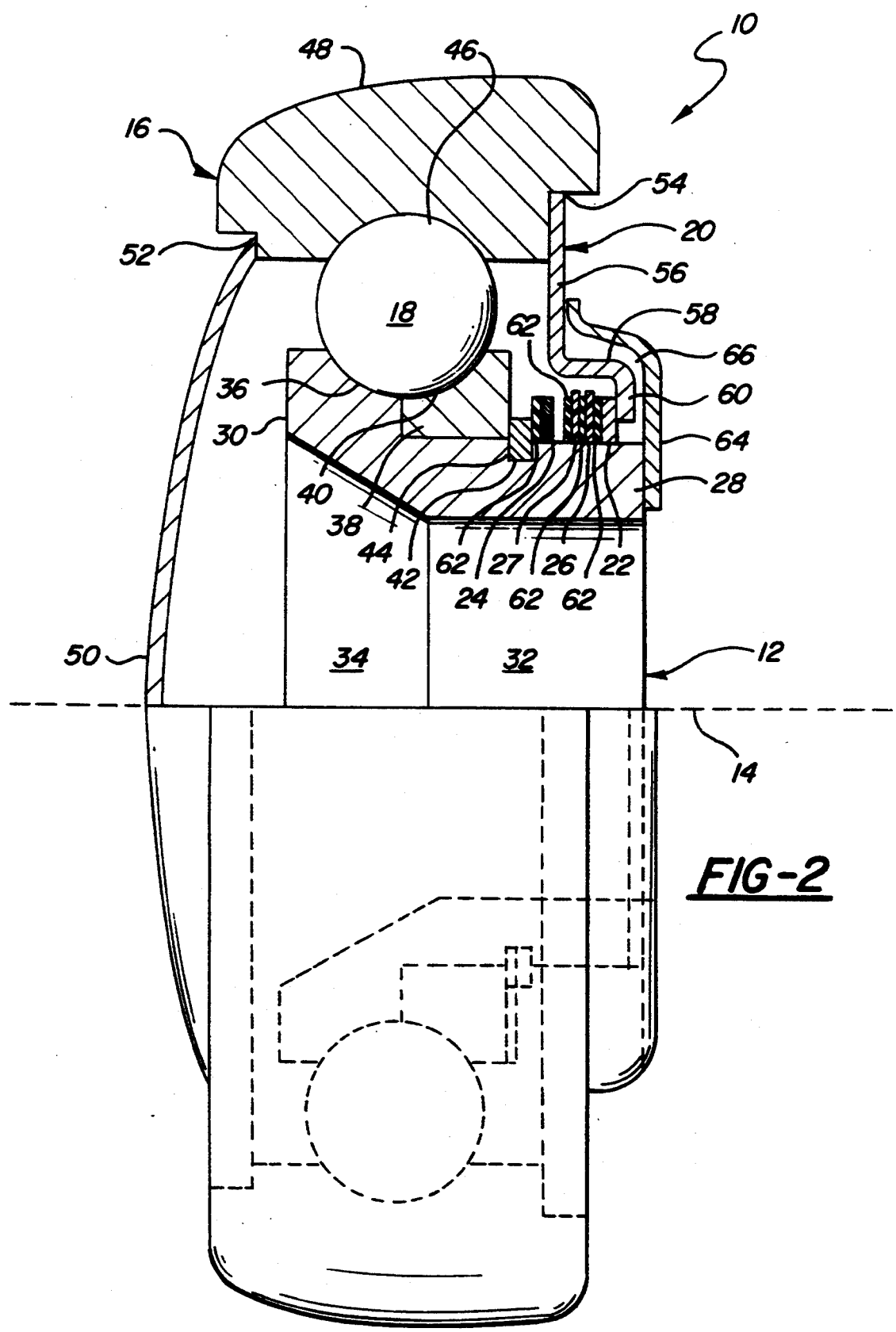
FIG. 2 is a cross sectional view of the trolley wheel taken along line 2—2 of FIG. 1.

A trolley wheel assembly securely sealed to prevent loss of lubricant from within the assembly and entrance of contaminants into the assembly over extended operating periods is generally shown at 10 in FIGS. 1 and 2. The trolley wheel assembly 10 includes an inner race 12 disposed about an axis of rotation 14. An outer race 16 is disposed in a spaced relationship concentrically about the inner race 12. A plurality of ball bearings 18 are disposed radially between the inner race 12 and the outer race 16 to permit the outer race 16 to rotate about the inner race 12.

An outer sealing ring 20 is fixedly mounted to the outer race 16 and extends radially inwardly toward the inner race 12. An inner sealing ring 22 is rotatably disposed about the inner race 12, extending radially outwardly toward the outer race 16 and contiguous the outer sealing ring 20. A biasing means 24 is disposed about the inner race 12 for biasing the inner sealing ring 22 into constant friction engagement with the outer sealing ring 20.

The invention is characterized by at least one backup inner sealing ring 26 rotatably disposed about the inner race 12 between the biasing means 24 and the inner sealing ring 22 to provide a secondary seal around the inner race 12 as rotation of the inner sealing ring 22 against the inner race 12 produces wear on the inner sealing ring 22 and a less secure fit about the inner race 12.

The inner race 12 includes an axial section 28 extending along the axis of rotation 14 and a radial section 30 extending radially outwardly from the axis of rotation 14. A hollow, cylindrical chamber 32 is disposed within the axial section 28. The cylindrical chamber 32 is joined by a frustoconical chamber 34 that tapers outwardly from the cylindrical chamber 32. The frustoconical chamber 34 is disposed substantially within the radial section 30, and partially within the axial section 28, of the inner race 12. In this manner, an axle (not shown) may be received within the chambers 32,34 to permit attachment of the trolley wheel 10 to a load carrying platform (not shown).

The radial section 30 of the inner race 12 includes a rounded groove 36 which forms a partial seat for the ball bearings 18. An inner race ring 38 is concentrically disposed about the axial section 28 adjacent the radial section 30 and also includes a rounded groove 40 which forms a partial seat for the bearings 18. Together, the grooves 36,40 form a channel or groove in which the bearings 18 may slidably rotate about the inner race 12. The inner race ring 38 is firmly held against the radial section 30 by a retaining ring 42 which is fixedly disposed within a slot 44 inside the axial section 28. Of course, other known configurations are possible such as combining the radial section 30 and the inner race ring 38 into one integral component, in which case the retaining ring 42 would not be necessary.

The outer race 16 comprises a hollow, circular member concentrically surrounding the inner race 12. The outer race 16 includes an inner circumferential bearing groove 46 which is disposed directly opposite and circumferentially surrounding the bearing grooves 36,40 on the inner race 12. The bearings 18 are thus seated in the grooves 36,40,46 between the inner and outer races 12,16. In this manner, the outer race 16 is slidably rotatable about the bearings 18 and, consequently, about the inner race 12. The outer race 16 includes an outer peripheral surface 48 which rollingly supports the trolley wheel assembly 10 for movement along a track or rail (not shown).

A welsh plug 50 is fixedly attached to the outer race 16 as is well known in the art and shields an exposed area within the outer race 16 on one side of the trolley wheel assembly 10. In this manner, the bearings 18, the radial section 30 of the inner race 12, and other components of the trolley wheel assembly 10 are protected. Because the welsh plug 50 is fixedly mounted to the outer race 16, it prevents lubricant from escaping and outside contaminants from entering the trolley wheel 10. The welsh plug 50 is disposed in abutting engagement within a groove 52 in the outer race 16.

The outer sealing ring 20 is fixedly mounted to a side of the outer race 16 directly opposite the welsh plug 50. The outer sealing ring 20 is disposed in abutting engagement within a groove 54 in the outer race 16. The outer sealing ring 20 comprises three sections. A first section 56 is attached to the outer race 16 and extends radially inwardly toward the axial section 28 of the inner race 12. A second section 58 extends axially outwardly from the first section 56, and a third section 60 once again extends radially inwardly toward, but not touching, the axial section 28. In other words, the outer sealing ring 20 is a "two-tiered" component extending from the outer race 16 to surround the axial section 28 of the inner race 12.

The inner sealing ring 22 includes an inner circumferential edge that rotatably surrounds the axial section 28 of the inner race 12. The inner sealing 22 also extends radially outwardly toward the second section 58 of the outer sealing ring 20. A lateral surface on the inner sealing ring 20 abuts the third section 60 of the outer sealing ring 20 and remains in slidable friction contact therewith. First and second backup inner sealing rings 26,27 are disposed about the second portion of the axial section 28, axially inwardly from the inner sealing ring 22. In the preferred embodiment, the inner sealing ring 22 and the backup inner sealing rings 26,27 are all comprised of polytetrafluoroethylene impregnated with bronze, although other materials would certainly be feasible and within the scope of the invention.

Figure 3:
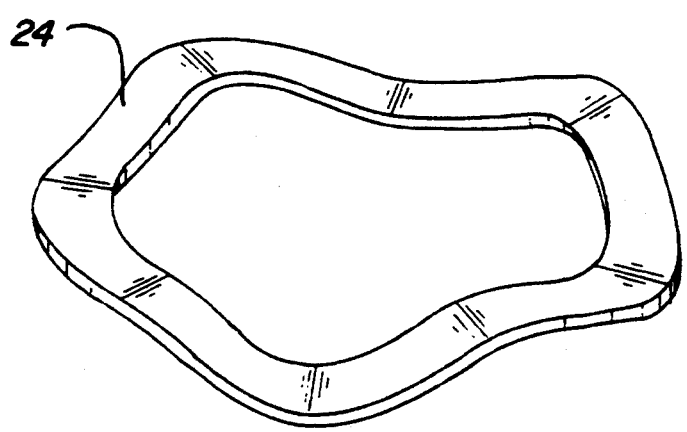
FIG. 3 is a frontal view of the biasing means.

The biasing means 24 is positioned between the second backup inner sealing ring 27 and the retaining ring 42. The biasing means 24 includes a diameter which is greater than the diameter of the retaining ring 42, such that the biasing means 24 extends farther radially outwardly from the inner race 12 than the retaining ring 42. The biasing means 24 in the preferred embodiment comprises a wave washer as shown in FIGS. 3 and 4. In other words, the biasing means 24 comprises a symmetrical, sinusoidal, stainless steel ring that undulates above and below a plane when viewed from a side elevation. The biasing means 24 biases the backup inner sealing rings 26,27 and the inner sealing ring 22 into constant friction engagement with one another and with the outer sealing ring 20. Other possible embodiments of the biasing means 24 could include a split washer, a coil spring, a garter spring, or any other type of spring biasing assembly.

In FIG. 2, a cross section of the wave washer 24 disposed on the trolley wheel 10 is shown, apparently not touching both of the adjacent spacer members 62. However, due to the convoluted shape thereof the wave washer 24 will at any given point only touch one of the adjacent spacer members 62. In particular, the embodiment shown in FIG. 3 will touch each adjacent spacer member 62 in four separate locations due to the four sinusoidal peaks and four sinusoidal valleys therealong. In this manner, the wave washer 24 biases against the adjacent spacent members 62 but is still compressible to permit flexibility and elasticity.

The use of stainless steel or a similar material in the biasing means 24 is particularly advantageous in enabling the biasing means 24 to retain its shape and effectiveness over extended operating periods and under extreme operating conditions. Stainless steel is more durable against wear and can withstand high temperature operations as compared to other biasing materials, such as felt or rubber. Of course, the longer the biasing means retains its strength and effectiveness, the longer the inner and outer sealing rings 20,22 will be kept in constant friction engagement and the longer the seal therebetween will remain intact.

An outer cover 64 is fixedly attached to the inner race 12 and extends radially outwardly toward the outer race 16. The outer cover 64 is shaped to substantially follow the contours of the outer sealing ring 20. In other words, the outer cover 64 extends radially outwardly from the inner race 12 parallel to the third section 60, then curves axially inwardly substantially parallel to the second section 56, and finally extends radially outwardly adjacent the first section 56. Accordingly, a labyrinthine passage 66 is formed between the outer cover 64 and the outer sealing ring 20 to shield an area of contact between the inner sealing ring 22 and the outer sealing ring 20. The labyrinthine passage 66 provides an initial barrier to outside contaminants to reduce the amount thereof that can potentially enter the trolley assembly 10.

A plurality of spacer means 62 are rotatably disposed about the second portion of the axial section 28, between the inner sealing ring 22 and the first backup inner sealing ring 26, and between the first and second backup inner sealing rings 26,27. Furthermore, a spacer means 62 is disposed on either side of the biasing means 24 to separate the biasing means 24 from both the retaining ring 42 and the second backup inner sealing ring 27. The spacer means 62 each comprise a stainless steel washer in the preferred embodiment, although other materials would be suitable. The spacer means 62 provide a buffer between each of the sealing rings 22,26,27 to inhibit and protect against wear caused by the rotation between adjacent sealing rings 22,26,27, and in particular caused by the inner sealing ring 22. The spacer means 62 also ensures that the biasing means 24 exerts a uniform force against the retaining ring 42. Otherwise, due to the differences in diameter between the biasing means 24 and the retaining ring 42 the biasing means 24 would not have an adequate surface to bias against.

To illustrate the operation and benefit of the trolley wheel 10 of the present invention, as the trolley wheel 10 rolls along a track, the outer race 16, and accordingly the outer sealing ring 20, rotate with respect to the inner race 12. The outer sealing ring 20 rotates past the inner sealing ring 22 in slidable friction engagement caused by the force of the biasing means 24. The outer sealing ring 22 will impart a portion of its rotational momentum to the inner sealing ring 22. Thus, the inner sealing ring 22 will rotate about inner race 12 due to the frictional engagement of the rotating outer sealing ring 20. However, the inner sealing ring 22 will not rotate at the same rate as the outer sealing ring due to the slippage and slidable engagement between the sealing rings 20,22. The rotating inner sealing ring 22 will then slidably engage the adjacent spacer means 62 and cause it to rotate as well, albeit to a lesser extent. In other words, the inner sealing ring 22 and adjacent spacer means 62 are also in constant, slidable friction engagement. Thus, as the inner sealing ring 22 rotates it will slide past the spacer means 62 while imparting a portion of its rotational momentum thereto, causing it to rotate but at a slower rate. This transfer of rotational momentum due to the slidable friction engagement between adjacent components will continue along the first backup sealing ring 26, the adjacent spacer means 62, the second backup sealing ring 27, and finally the biasing means 24. Thus, each of the sealing rings 22,26,27, spacers 62, and the biasing means 24 will rotate at consecutively slower rates while frictionally sliding past one another.

The rotation of the spacer means 62 and the sealing rings 22,26,27 is directly related to the wear thereon due to the frictional contact between adjacent members and between each member and the inner race 12. Thus, the farther a member is spaced from the inner sealing ring 22 the slower it may rotate compared to the outer sealing ring 20 and the less wear it will receive due to the decreased frictional resistance. Furthermore, since the spacer means 62 space the sealing rings 26,27 and biasing means 24 away from the inner sealing ring 22, the sealing rings 26,27 and biasing means 24 will thus be isolated and buffered against wear caused by the rotation of the inner sealing ring 22. It would be possible to omit the spacer means 62 and substitute additional backup sealing rings 26,27 to achieve the same decrease in rotation of consecutive sealing rings 22,26,27 and the corresponding decrease in wear. However, for reasons of economy the spacer means 62 are utilized to avoid unnecessary use of the backup sealing rings 26,27 because only two backup sealing rings 26,27 are required to effectively provide a backup for the inner sealing ring 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A wheel assembly (10) securely sealed to prevent loss of lubricant from within the assembly (10) and entrance of contaminants into the assembly (10) over extended operating periods, said assembly (10) comprising:

an inner race (12) disposed about an axis of rotation (14);

an outer race (16) concentrically disposed in a spaced relationship about said inner race (12);

a bearing assembly (18) disposed radially between said inner race (12) and said outer race (16) to permit said outer race (16) to rotate about said inner race (12);

an outer sealing ring (20) fixedly mounted to said outer race (16) and extending radially inwardly toward said inner race (12);

an inner sealing ring (22) rotatably disposed about said inner race (12), extending radially outwardly toward said outer race (16) and contiguous said outer sealing ring (20);

biasing means (24) disposed about said inner race (12) for biasing said inner sealing ring (22) into constant friction engagement with said outer sealing ring (20); and characterized by at least one backup inner sealing ring (26) rotatably disposed about said inner race (12) between said biasing means (24) and said inner sealing ring (22) to provide a secondary seal around said inner race (12) as rotation of said inner sealing ring (22) against said inner race (12) produces wear on said inner sealing ring (22) and a less secure fit about said inner race (12).

2. An assembly as set forth in claim 1 further characterized by first and second backup inner sealing rings (26,27).

3. An assembly as set forth in claim 2 further characterized by said first and second backup inner sealing rings (26,27) each comprising polytetrafluoroethylene impregnated with bronze.

4. An assembly as set forth in claim 2 further characterized by spacer means (62) rotatably disposed about said inner race (12) for providing a buffer to protect against wear caused by the rotation of said inner sealing ring (22).

5. An assembly as set forth in claim 4 further characterized by said spacer means (62) disposed between said inner sealing ring (22) and said first backup sealing ring (26).

6. An assembly as set forth in claim 5 further characterized by said spacer means (62) disposed between said first and second backup sealing rings (26,27).

7. An assembly as set forth in claim 4 further characterized by said spacer means (62) comprising a plurality of washers.

8. An assembly as set forth in claim 4 further characterized by an inner race ring (38) concentrically disposed about said inner race (12).

9. An assembly as set forth in claim 8 further characterized by a retaining ring (42) concentrically disposed about said inner race (12) between said biasing means (24) and said inner race ring (38).

10. An assembly as set forth in claim 9 further characterized by said spacer means (62) disposed between biasing means (24) and said retaining ring (42).

11. An assembly as set forth in claim 1 further characterized by said biasing means (24) comprising a wave washer.

12. An assembly as set forth in claim 11 further characterized by said wave washer (24) comprising stainless steel.

13. An assembly as set forth in claim 1 further characterized by an outer cover (64) disposed about said inner race (12) and extending radially outwardly toward said outer race (16) to shield an area of contact between said outer sealing ring (20) and said inner sealing ring (22).

14. An assembly as set forth in claim 1 further characterized by said inner sealing ring (22) comprising polytetrafluoroethylene impregnated with bronze.

15. An assembly as set forth in claim 1 further characterized by a welsh plug (50) securely engaged with said outer race (16) and covering said inner race (12).

* * * * *